May 16, 1967   G. A. RATH ET AL   3,319,733
VEHICLE SPEED RESPONSIVE CONTROL SYSTEM
Filed July 16, 1965   2 Sheets-Sheet 1

INVENTORS
Gerald A. Rath,
BY Jackson R. Templin, &
Kenneth H. Clayton
Albert F. Duke
ATTORNEY INVENTORS
Gerald A. Rath,
BY Jackson R. Templin, &
Kenneth H. Clayton
Albert F. Duke
ATTORNEY //  
United States Patent Office 3,319,733  
Patented May 16, 1967

---

3,319,733  
VEHICLE SPEED RESPONSIVE CONTROL SYSTEM  
Gerald A. Rath, Jackson R. Templin, and Kenneth H. Clayton, all of Anderson, Ind., assignors to General Motors Corporation, Detroit, Mich., a corporation of Delaware  
Filed July 16, 1965, Ser. No. 472,588  
7 Claims. (Cl. 180—106)

This invention relates to control systems and more particularly to a motor vehicle control system which may be selectively placed in either a speed warning or speed control mode of operation.

In accordance with the present invention, apparatus is provided for applying a tapping or thumping force to the accelerator pedal through the vehicle throttle linkage to inform the operator when the actual speed of the vehicle has reached a predetermined maximum speed as set by the operator. With the actual speed of the vehicle at the desired speed, the operator may, if he so desires, place the system in a speed control mode of operation wherein the vehicle throttle is automatically positioned in accordance with the vehicle load demands to maintain the vehicle speed substantially constant.

The apparatus of the present invention includes a fluid pressure actuator which is coupled to the vehicle throttle through a solenoid operated plunger which is carried by a diaphragm of the actuator. The pressure in the actuator is responsive to the operation of an electromagnetic control valve assembly which includes throttle position feedback means. Control circuitry is provided by applying an oscillatory signal to the solenoid when the system is in the speed warning mode of operation and for applying a constant frequency variable duty cycle signal to the control valve assembly when the system is in the control mode of operation. In the speed warning mode of operation, the control valve assembly is disconnected from the control circuitry and in the speed control mode of operation the solenoid is continuously energized to close a bleed port in the actuator diaphragm which allows the control valve assembly to regulate the pressure in the actuator in a manner to maintain a constant speed.

A more complete understanding of the present invention may be had from the following detailed description which should be read in conjunction with the drawings in which.

Figure 1:
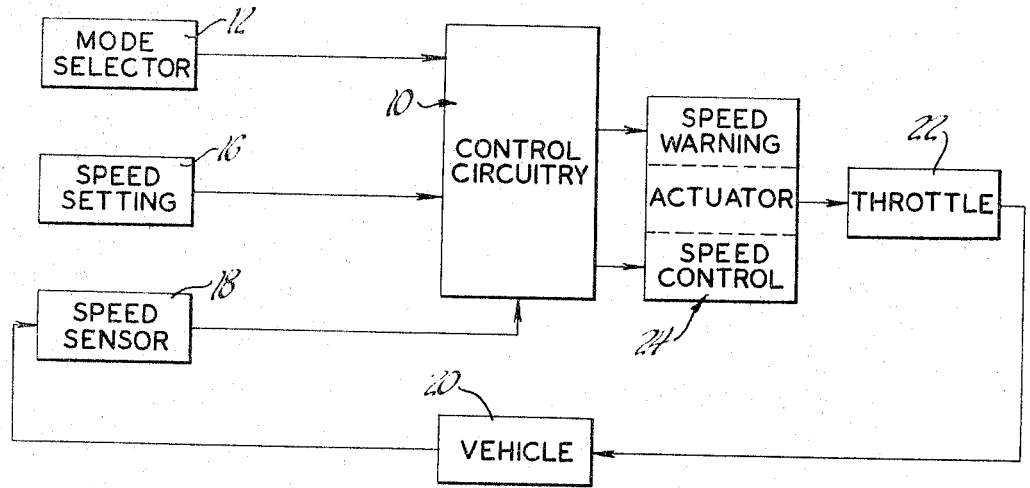
FIGURE 1 is a block diagram of the system.

Referring now to the drawings and initially to FIGURE 1, the control system of the present invention is shown in blocked diagram and includes control circuitry 10 which is programmed for either speed warning or speed control operation by a mode selector 12. The control circuitry 10 is responsive to a desired vehicle speed input obtained from a vehicle operator control speed setting 16 and an actual speed input obtained from a sensor 18 which is responsive to the speed of the vehicle 20. The speed of the vehicle 20 is determined by the position of the vehicle throttle 22 which is under the control of an actuator 24 which is selectively operable in either a speed warning or speed control mode of operation.

Figure 2:
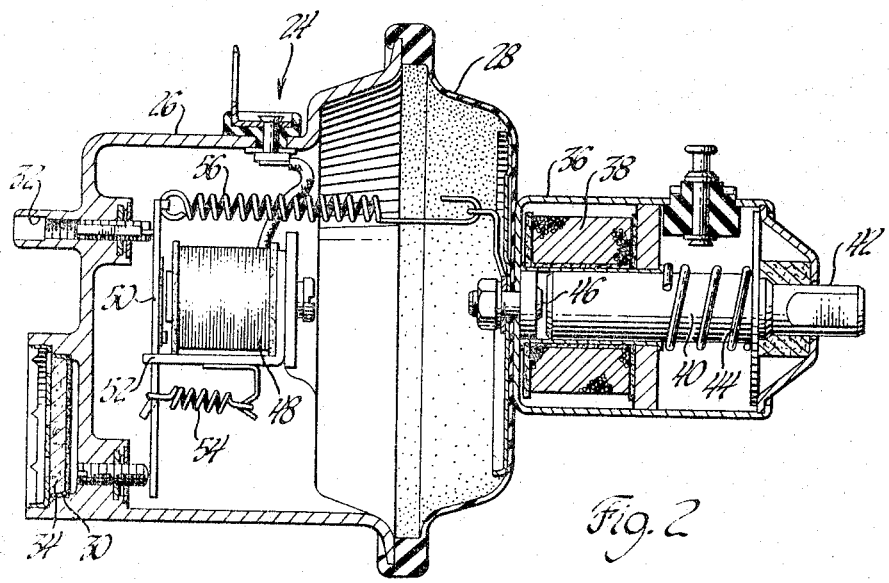
FIGURE 2 is a sectional view of the actuator of the present invention.

Referring now to FIGURE 2, the actuator 24 includes a housing 26 which is closed at one end by a flexible diaphragm 28 and is provided at the other end with a port 30 which is open to the atmosphere and a vacuum port 32 which is connected with the vehicle engine manifold. A filter 34 is provided at the atmospheric port 30. The diaphragm 28 supports a housing 36 which carries a solenoid including a coil 38 and a plunger 40. The plunger 40 is connected by a throttle linkage 42 to the vehicle throttle 22 and is normally biased by a spring 44. Relative movement between the plunger 40 and the diaphragm 28 is sufficient enough to impart a relatively sharp impulse to the throttle linkage in response to energization and deenergization of the solenoid coil 38. The housing 26 supports an electromagnetic control valve assembly which includes an electromagnet 48 which controls the position of an armature 50. The armature 50 is supported in a teeter-totter fashion by a support 52 and is biased to the position shown by a spring 54. A spring 56 is connected at one end to the diaphragm 28 and at the other end to the armature 50 for stabilization of the system. The spring 56 provides throttle position feedback which changes the effective valve opening each time the throttle moves. Thus the forces operating on the armature 50 are threefold; namely, the force of the biasing spring 54; the electromagnetic force of the electromagnet 48; and the throttle position responsive force of the spring 56. Once the bleed port 46 has been sealed, the diaphragm 28 will be moved to a position corresponding to the pressure within the actuator 24 as established by the electromagnetic control valve assembly thus controlling the position of the throttle 22.

Figure 3:
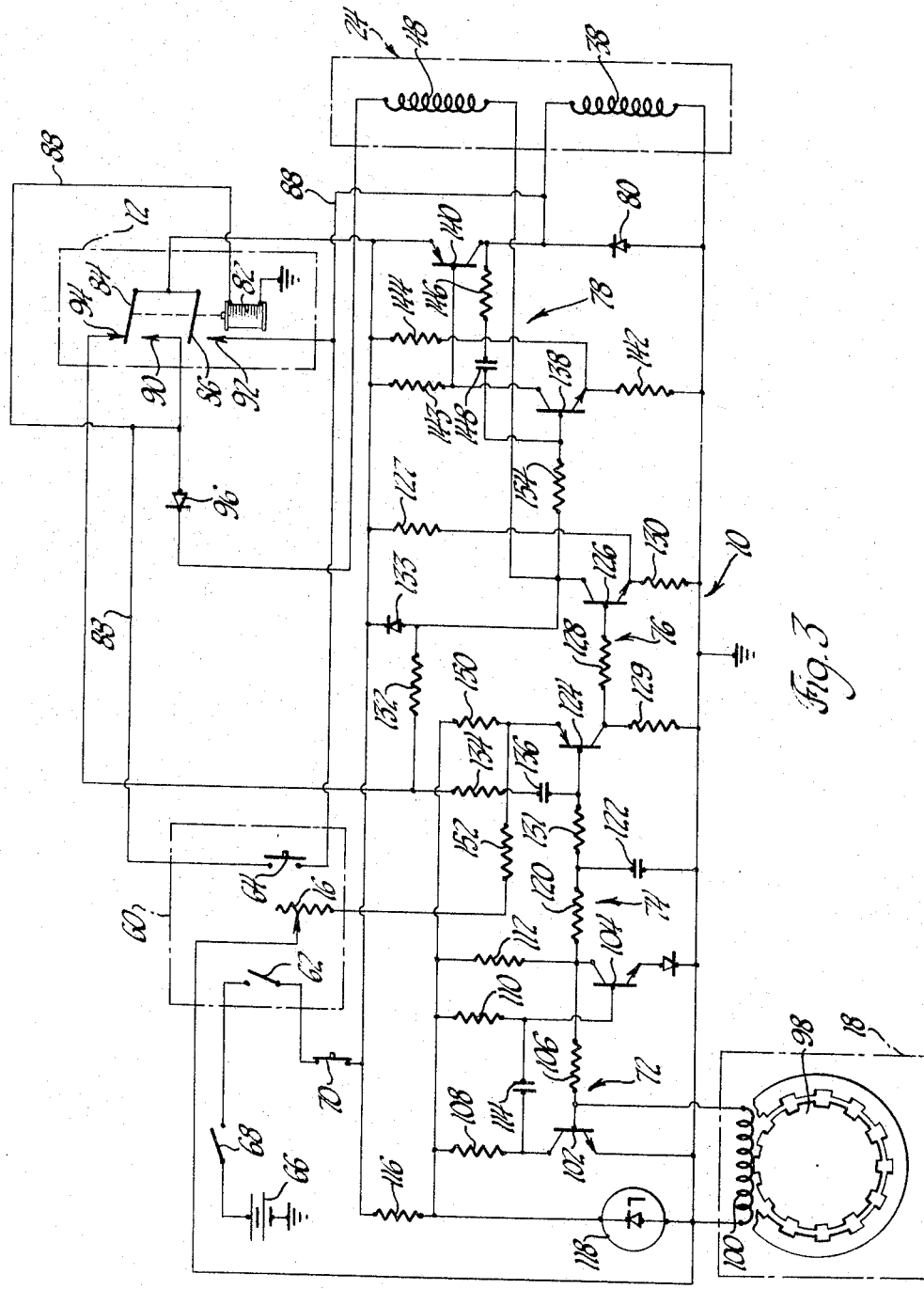
FIGURE 3 is a schematic diagram of the control circuitry of the present invention.

Referring now to FIGURE 3, a schematic diagram of the control system is shown. The elements generally designated 60 allow the driver of the vehicle to control the operation of the system and includes a normally open switch 62, the speed setting potentiometer 16 and the normally open momentary contact switch 64. Preferably, these elements form a single control knob within easy access to the driver of the vehicle. The switch 62 connects a source of voltage 66 which is preferably the vehicle battery through the vehicle ignition switch 68 and a normally closed brake pedal position responsive switch 70 to the control circuitry 10. The control circuitry 10 includes a multivibrator 72, an integrator network 74, a two stage amplifier 76, and an oscillator 78. The solenoid coil 38 which is shunted by a diode 80 is connected in the output circuit of the oscillator 78. A relay 82 including armatures 84 and 86 is also connected in the output circuit of the oscillator 78 through a conductor 88 and the normally open switch 64. In the position shown, relay contacts 90 and 92 are open and contact 94 is closed. A diode 96 connects one side of the electromagnet 48 to the normally open contacts 90. The other side of the electromagnet 48 is connected to the output of the amplifier 76. The speed sensor 18 is a permanent magnet pulse generator driven by the vehicle speedometer drive mechanism and comprises a toothed wheel 98 and a pick up coil 100. The sensor 18 provides a variable frequency input to the multivibrator 72 dependent upon the actual speed of the vehicle.

The multivibrator 72 is a conventional triggered multivibrator and comprises transistors 102 and 104, resistors 106 through 112 and capacitor 114. A resistor 116 and a zener diode 118 establish a voltage across the multivibrator 72 and the first stage of the amplifier 76 which is maintained substantially constant. The integrator network 74 is connected across the output of the multivibrator 72 and comprises a resistor 120 and a capacitor 122.

The amplifier 76 comprises transistors 124 and 126 and resistors 128 through 130. A resistor 131 connects the network 74 to the base of transistor 124. The voltage at the emitter of transistor 124 is determined by the resistors 150 and 152 and the setting of the potentiometer 16. A resistor 132 connects the collector of transistor 126 through the normally closed contact 94 to the battery 66. When the relay 82 is energized to break the circuit at the contact 94, a feedback path is established between the collector of transistor 126 and the base of transistor 124 and includes the resistor 132, resistor 134 and capacitor 136. The amplifier 76 is connected to the oscillator 78 through a resistor 154.

The oscillator 78 comprises transistors 138 and 140, resistors 142 through 146 and capacitor 148 and develops a pulsating output signal at a frequency which the solenoid plunger 48 can consistently follow.

Speed warning mode of operation

In this mode of operation, the switch 62 is closed and the switch 64 is open. Thus the relay 82 is deenergized and the load on the amplifier 76 is the resistor 132. The speed sensor 18 develops a pulse train for triggering the multivibrator 72 at a frequency dependent upon the actual speed of the vehicle. Thus the output of the multivibrator 72 is a square wave of variable frequency. A D.-C. voltage is established across the capacitor 122, the magnitude of which is dependent upon the actual speed of the vehicle. When the actual speed of the vehicle is below the desired speed as represented by the voltage at the emitter of transistor 124, the output of amplifier 76 maintains the oscillator 78 in a cut off condition. When the speed of the vehicle reaches the desired speed, the voltage at the base of transistor 124 is sufficient to cut off the amplifier 76 which renders the oscillator 78 operative and applies a pulsating signal to the solenoid coil 38. This in turn applies a thumping or tapping vibration to the accelerator pedal which warns the operator of the vehicle that a preset maximum speed has been reached.

Speed control mode of operation

If the vehicle operator desires to place the system in a speed control mode of operation, the actual speed of the vehicle is first brought up to the desired speed so that a pulsating signal appears at the collector of transistor 140. If the switch 64 is now momentarily closed, the relay 82 will be energized through the conductor 88 drawing the armatures 84 and 86 into engagement with contacts 90 and 92. The relay 82 is maintained in an energized position through a holding circuit established by the closing of contact 90. The closing of contact 92 supplies battery voltage to the solenoid coil 38 through the conductor 88 and thus maintains the solenoid plunger 40 in a position to seal the bleed port 46 in the diaphragm 28. Additionally, when the contact 94 is broken, the feedback circuit including the resistors 132 and 134 and the capacitor 136 is operative to cause the amplifier 76 to oscillate. The electromagnet 48 which has now been placed in the collector circuit of the transistor 126 as a result of closure of the contact 90 will receive a constant frequency pulsating electrical signal of a frequency which the armature 50 can consistently follow. If the actual speed of the vehicle is the same as the set speed, the transistors 124 and 126 oscillate on and off in synchronism and during intervals of time which are equal. However, if due to varying load conditions on the vehicle the actual speed of the vehicle should drop, the voltage at the base of transistor 124 would be accordingly lowered and during one cycle of operation, the length of time that the transistors 124 and 126 conduct is greater than the length of time which they do not conduct. This variation in on-off time decreases the pressure in the actuator 24 which will move the throttle in a direction to increase the speed of the vehicle. Correspondingly, if the actual speed of the vehicle should increase above the set speed, the opposite effect will occur.

The system may be deenergized by either opening the switch 62 or pressing on the brake pedal which opens the switch 70. This will deenergize the solenoid coil 38 and open the bleed port 46. The opening of this port when the system is deenergized allows the throttle mechanism to move at a rate determined by the throttle mechanism itself rather than at a slower rate determined by the rate of the actuator control mechanism. The port 46 also provides a safety feature in that it produces an alternate path by which the pressure in the actuator 24 can be increased and the vehicle speed correspondingly decreased should the control valve not function properly.

While the invention has been described with regard to a preferred embodiment thereof, this should not be construed in a limiting sense. Variations and modifications will now occur to those skilled in the art. For a definition of the invention, reference is made to the appended claims.

We claim:
1. A motor vehicle speed responsive control system comprising vehicle throttle positioning means,
   electromagnetic means operatively coupling the vehicle throttle to said positioning means,
   control circuitry,
   means for applying an actual vehicle speed input and a desired vehicle speed input to said control circuitry,
   switching means for programming said control circuitry for either a speed warning or speed control mode of operation,
   said control circuitry applying a first pulsating electrical signal to said electromagnetic means when said actual vehicle speed reaches said desired vehicle speed during the speed warning mode of operation,
   said control circuitry applying a second pulsating electrical signal to said throttle positioning means and a direct current to said electromagnetic means during the speed control mode of operation,
   said second pulsating electrical signal having an average value indicative of the difference between said actual vehicle speed and said desired vehicle speed.

2. The system defined in claim 1 wherein said control circuitry includes a multivibrator responsive to said actual vehicle speed input for developing a substantially square wave output signal,
   means for developing a first D.-C. voltage corresponding to the frequency of said multivibrator output signal,
   an amplifier responsive to said first D.-C. voltage and a second D.-C. voltage corresponding to said desired vehicle speed,
   an oscillator connected to the output of said amplifier,
   said electromagnetic means being connected to the output of said oscillator,
   said throttle positioning means being connected through said switching means to the output of said amplifier,
   feedback means adapted to be connected between the output and the input of said amplifier means by actuation of said switching means whereby said amplifier oscillates to apply said second pulsating signal to said throttle positioning means upon actuation of said switching means.

3. A motor vehicle speed responsive control system comprising first means coupled to the vehicle throttle for controlling the speed of the vehicle,
   second means coupled to the vehicle accelerator pedal for applying a vibratory force thereto,
   means for developing a pulse train varying in frequency with the actual speed of said vehicle,
   means for developing a D.-C. voltage related to the frequency of said pulse train,
   means for developing a D.-C. voltage proportional to the desired vehicle speed,
   oscillator means,
   said second means being connected to the output of said oscillator means,
   amplifier means responsive to said D.-C. voltages, the output of said amplifier means being connected to the input of said oscillator means,
   manually operable switching means for placing said system in either a speed warning or speed control mode of operation, feedback means adapted to be connected between the output and the input of said amplifier means by actuation of said switching means, actuation of said switching means connecting said first means to the output of said amplifier means.

4. A motor vehicle speed responsive control apparatus comprising a fluid pressure actuator for controlling the vehicle throttle position, said actuator comprising an enclosure having first and second ports communicating with a fluid at first and second pressures respectively, a flexible diaphragm forming a portion of said enclosure and being movable in response to the pressure within said enclosure, means coupling said diaphragm to the vehicle throttle, electromagnetic control valve means, support means mounting said valve means within said enclosure, said valve means including coil means and an armature movable in opposite directions about an axis located between said ports to alternately open and close said ports, means for biasing said armature in one direction about said axis, throttle position feedback means connected between said diaphragm and said armature for applying a variable force to said armature in an opposite direction about said axis, control circuitry for applying a pulsating electrical signal to said control valve means of substantially constant frequency and having an average value proportional to the difference between the actual vehicle speed and a desired vehicle speed.

5. The apparatus claimed in claim 4 wherein said first and second pressures are respectively atmospheric and engine manifold vacuum.

6. Motor vehicle speed responsive control apparatus comprising a fluid pressure actuator including a flexible diaphragm movable in accordance with the pressure within said actuator, said actuator being provided with atmospheric and vacuum ports, electromagnetic control valve means supported within said actuator and including an armature operable to alternately close and open said ports, said diaphragm being provided with a bleed port to the atmosphere, a solenoid including coil means and a plunger supported by said diaphragm, means coupling said plunger to the vehicle throttle, said plunger arranged to open and close said bleed port under the control of said coil means, control circuitry including oscillator means for applying an oscillatory electrical signal to said coil means when the actual speed of said vehicle reaches a desired set speed, said control circuitry including operator controlled switching means adapted to connect said coil means to a source of substantially constant D.-C. voltage to close said bleed port, said control circuitry responsive to actuation of said switching means to supply an oscillating signal to said electromagnetic control valve means, said oscillating signal being of substantially constant frequency having an average value dependent upon the difference between said actual speed and said desired speed.

7. Motor vehicle speed responsive control apparatus comprising a fluid pressure actuator including a flexible diaphragm movable in accordance with the pressure within said actuator, said actuator being provided with atmospheric and vacuum ports, electromagnetic control valve means, support means mounting said valve means within said enclosure, said valve means including coil means and an armature pivotally supported about an axis between said ports to alternately open and close said ports, biasing means connected between said support and said armature on one side of said axis, throttle position feedback means connected between said diaphragm and said armature on the opposite side of said axis, said coil means adapted when energized to apply an electromagnetic force to said armature on said opposite side of said axis, said diaphragm being provided with a bleed port to the atmosphere, a solenoid including coil means and a plunger supported by said diaphragm, means coupling said plunger to the vehicle throttle, said plunger arranged to open and close said bleed ports under the control of said coil means, control circuitry for applying a pulsating electrical signal to said solenoid coil means during a speed warning mode of operation, said control circuitry adapted to supply a pulsating output signal of constant frequency and variable duty cycle to said electromagnetic control valve means when in a speed control mode of operation and switching means for selecting the mode of operation of said control circuitry, said solenoid coil means being continuously energized through said switching means during the speed control mode of operation.

References Cited by the Examiner

UNITED STATES PATENTS

| | | | |
|---|---|---|---|
| 3,070,185 | 12/1962 | Fales | 123—102 X |
| 3,087,340 | 4/1963 | McMurray et al. | 317—5 X |
| 3,157,244 | 11/1964 | McMurray et al. | 180—82.1 |
| 3,166,145 | 1/1965 | Wheeler | 180—82.1 |
| 3,217,827 | 11/1965 | Pickles | 123—102 X |

KENNETH H. BETTS, *Primary Examiner.*